Dec. 22, 1959 R. L. EDSBERG ET AL 2,918,584
LIGHT RESPONSIVE ELECTRICAL DEVICE
Filed Oct. 20, 1955

INVENTOR.
ROBERT L. EDSBERG
JAMES A. OGLE
BY
Ralph K. Bonell
AGENT

United States Patent Office 2,918,584

Patented Dec. 22, 1959

2,918,584

LIGHT RESPONSIVE ELECTRICAL DEVICE

Robert L. Edsberg and James A. Ogle, Paoli, Pa., assignors to Burroughs Corporation, Detroit, Mich., a corporation of Michigan Application October 20, 1955, Serial No. 541,664

18 Claims. (Cl. 250—239)

The present invention relates to optical systems and more particularly to the mounting of a light-sensitive photocell and associated components as an encapsulated assembly of an optical system.

In optical systems heretofore used wherein a lens, a light-sensitive crystal and electrical components have been assembled in a potting material or compound, it has been found that when a conductive paste, such as silver and shellac, is employed to bond certain of the elements of the system as complete electrical circuits, this paste reacts badly when exposed to such material; also that the crystal surface is affected by contact with the material. Reactions of this type produce unpredictable surface effects in a photocell crystal which alter or destroy the sensitivity of the photocell and render a unit of this type unuseable.

An object of the present invention is to provide an optical system wherein encapsulated electrical components are maintained isolated from the potting material to prevent deleterious surface effects affecting the sensitivity of photocells or other components included in the optical system.

Another object of the invention is to provide a novel mounting for a light-sensitive cell in association with an optical system wherein the cell and its electrical connections are protected from deterioration by an inert liquid.

Another object is to provide an optical system wherein an assembly of a photocell and its bonded connections is protected from contact with a potting material which encapsulates certain of the cell components.

A further object is to provide an optical system having the above advantages which is primarily intended for use as an automatic dimmer for the headlights of an automobile when the latter is approached by an automobile having headlamps projecting beams of light.

A further object is to provide an optical system comprising a lens and a light-sensitive crystal wherein reflective interfaces are eliminated through the use of an inert fluid material.

A further object is to provide an optical system wherein a lens and a light-sensitive crystal are so interconnected and protected as to obtain the maximum response to light beams traversing the lens.

A still further object is to provide an optical system for association with an automobile headlight control including a lens and a light-sensitive crystal wherein masking means are provided to limit the utilized portion of beam of light received from an approaching automobile.

Other features and objects will hereinafter appear.

In the accompanying drawings

Figure 1:
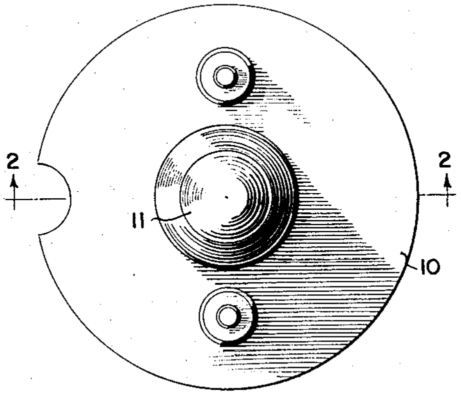
Fig. 1 represents a top plan view of a light sensitive cell assembly embodying one form of the present invention.
Figure 4:
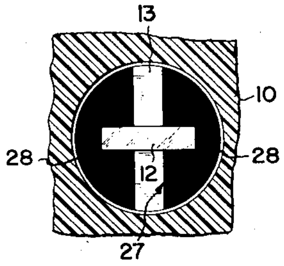
Fig. 4 represents a partial section view along line 4—4 of Fig. 2.

Referring to the drawings, one form of the invention comprises a body 10 of moldable material, such as a plastic, having a lens 11 mounted therein to direct beams of light upon a juxtaposed light-sensitive crystal 12. Preferably, but not necessarily, the lens 11 is molded integral with the body 10 and has a transversely disposed rib 13 projecting from its inner face. Instead of an integral construction lens 11 may, for example, be inserted in a bore of body 10. In either case the lens is effectively located in an aperture in body 10 adapted to pass light rays to the interior of the body. The body 10, in this instance, is in the form of a disc provided with an inner flange bounded by wall 14 generally concentrical with the lens 11 and forming a central pocket or cavity 15 about the rib 13 and inner face of lens 11. Pocket 15 is filled during assembly with an inert material 16, preferably a silicone oil of high viscosity and low solvent action such, for example, as Dow Corning Silicone Fluid No. 200. This fluid has a sufficiently high index of refraction so that total refraction, present with air spaces between optical elements, is avoided and by filling such air spaces its use ensures what may be called "optical continuity" between the lens 11 and the crystal 12. Body 10 has an outer continuous flange 17 molded upon its inner face, illustratively of rectangular shape, having a depth forming a receptacle 18 to receive electrical components such as resistors 20 and 21.

Figure 2:
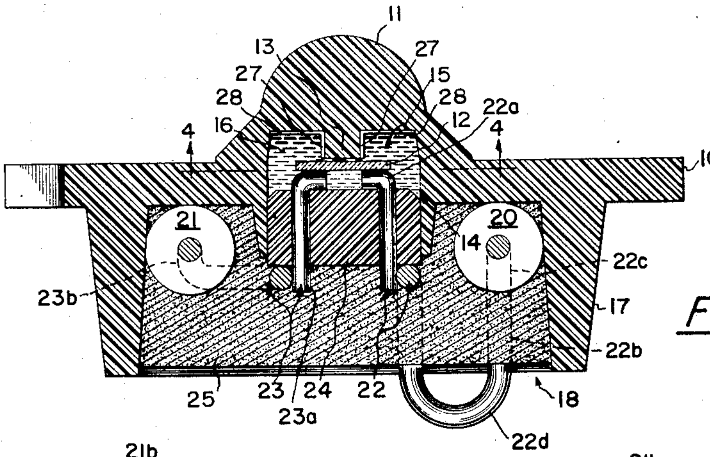
Fig. 2 represents a section on line 2—2 of Fig. 1.
Figure 3:
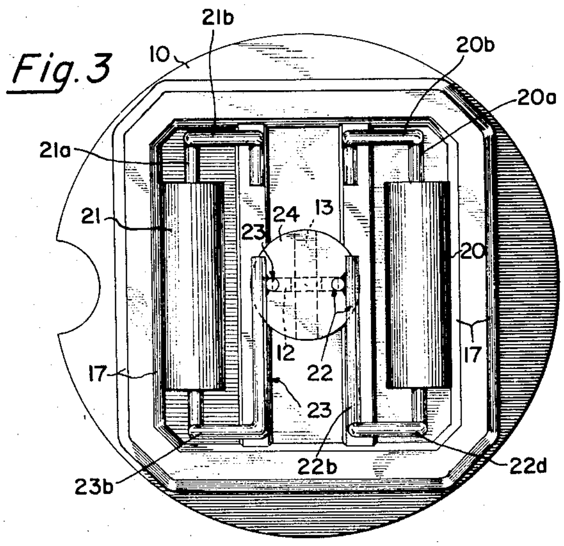
Fig. 3 represents a bottom plan view of the cell.
Figure 5:
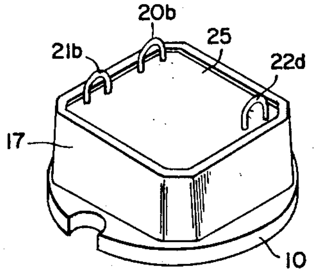
Fig. 5 is an inverted perspective view of the cell showing terminal connections extending therefrom.

The light-sensitive crystal 12 is preferably a cadmium sulphide element optically in contact with the rib 13 through the medium of fluid 16 and is located at the correct distance behind the apex of the lens 11 for a field of view such as is desirable in the automobile light dimming system of which it forms a component. For such mounting, the crystal 12 is bonded to the upper ends of portions **22*a* and 23*a* of electrical leads 22 and 23. Portions 22*a* and 23*a* are fixed to and pass through an insert button or closure 24 forced into the central pocket bounded by wall 14 to support the crystal in as close physical contact as is possible with the lens rib 13. Reflective interfaces due to unavoidable air spaces are eliminated by the fluid 16. Preferably the bonding between the crystal and the leads is made by a conductive paste, for example comprising silver and shellac. As seen in Figs. 2 and 3 of this exemplary embodiment of the invention, lead 22 includes the aforementioned portion 22*a* and another portion 22*b*. The latter identified portion provides one lead of resistor 20 and includes a U-shaped portion 22*c*, the bottom 22*d* of which extends to the exterior of the unit to serve as a terminal providing convenient means for external circuit connections. Lead 23, as seen in Figs. 2 and 3 includes the aforementioned portion 23*a* and another portion 23*b*, the latter portion providing one lead of resistor 21. Each of the resistors 20 and 21 includes another lead 20*a* and 21*a*, respectively, as seen in Figs. 3 and 5, each having a U-shaped portion 20*b* and 21*b*, respectively, extending to the exterior of the unit, as seen more clearly in Fig. 5, to serve as terminals providing convenient means for external circuit connection. The closure 24 is formed of insulating material and in addition to properly locating the crystal serves to seal the central inner pocket 15 from the outer receptacle 18. In the preferred use, the crystal 12 is connected to a direct current source, in series with the resistor 21 which serves as a protective resistance for the crystal and resistor 20** across which the output signal appears. Details of the foregoing circuit arrangements are explained in co-pending application, Serial No. 462,-205, filed October 14, 1954 for Automatic Headlight Dimmer Systems.

Means constituting, in effect, an optical field stop, which in the illustrated embodiment of the invention limits the field in one direction (but need not and often will not be so restricted) operates in conjunction with other stop means (not shown) to limit the utilized portion of a received beam of light and, in addition, defines the utilized portion of the surface of crystal 12. Said means comprises an opaque coating 27 on the sides of rib 13 transverse of crystal 12 in conjunction with an opaque coating 28 on the posterior surface of lens 11, on each side of rib 13.

In assembling the unit, the body 10 is inverted to permit the inert fluid 16 to be introduced, whereupon the closure 24 with its supported crystal 12 is inserted in the opening bounded by wall 14 to the proper depth to close the pocket or cavity 15 in which the crystal 12 is introduced and to bring the crystal into contact with the lens rib 13. The resistors 20 and 21, with proper connections to the leads, are located in the receptacle 18 to be encapsulated by a suitable potting compound 25, preferably an epoxy resin having a low shrinkage comparable favorably to that of the plastic body 10.

It has been found that most potting compounds coming in contact with photoelectric crystals cause surface effects destroying the sensitivity of the crystal. Further, the conductive silver and shellac bonding paste commonly used to connect leads to the crystal reacts badly by contact with such compounds. These detrimental reactions are now overcome by the inert silicone fluid in the cavity 15 which, with the closure 24, isolates the crystal and its connections from any contact with the potting compound. This fluid thus has a dual function, because in addition to preventing chemical reaction it eliminates deleterious reflective interfaces between optical components.

It will now be apparent that novel means have been disclosed adapted for use in a system for dimming the headlights of a vehicle in response to beams of light received from approaching vehicles at night, these novel means including a photoelectric or like device, an encapsulated circuit assembly therefor and a lens cooperative therewith. Furthermore, masking means are provided which operate in conjunction with the lens (and which also may cooperate with other optical means not forming a part of the present invention) to define the limits of the utilized portion of a beam of light received by a vehicle in suitable manner to insure prompt dimming of the headlights thereof under prescribed conditions. Optical efficiency is promoted by the fact that the received beam after leaving the lens does not have to pass through air to reach the opposed sensitive surface of the photoelectric device, an inert fluid having a suitable refractive index being provided to fill any interstices between the lens and said sensitive surface and eliminate reflections which would otherwise occur at interfaces between media of different refractive indices.

The embodiments of the invention shown and described herein are by way of illustration and not by way of limitation. The limits of the invention are defined solely in the appended claims.

What is claimed is:

1. An optical system comprising a body forming a pocket and a receptacle surrounding said pocket, means comprising a photoelectrically sensitive surface located in said pocket, a lens formed in said body directing light from an external source upon said surface, means including electrical terminals for supporting said photoelectric means, an inert fluid about said terminals, electrical components in said receptacle connected to said photoelectric means, a potting compound embedding said components, and sealing means separating said fluid from contact with said compound.

2. An optical system according to claim 1 wherein said fluid establishes a continuous optical path between said lens and crystal substantially free of reflective interfaces.

3. An optical system according to claim 1 wherein means is provided to mask said lens to restrict light rays received in a single plane.

4. An optical system according to claim 1 wherein means is provided to mask said lens to restrict light rays received in two planes.

5. An optical system according to claim 1 wherein mask means are provided serving both to limit the field of the optical system and to limit the utilized area of said photoelectrically sensitive surface.

6. An optical system comprising a body having a through aperture for the passage of light rays, a lens in said aperture, means forming a cavity in said body aligned with said lens, photoelectric means in said cavity, means holding said photoelectric means in contact with said lens, electrical leads having terminals bonded to said photoelectric means, a receptacle integral with said body, electrical components in said receptacle operatively connected to said leads, a potting compound in said receptacle encapsulating said components, an inert fluid in said cavity about said electrical leads, and means sealing said cavity from said potting compound.

7. An optical system comprising a body formed with a pocket and a receptacle surrounding said pocket, said body having an aperture opening into said pocket for the passage of light rays, a lens in said aperture for transmitting light from an external source therethrough, a sealing closure for said pocket forming a cavity juxtaposed to said lens, a photoelectric crystal in said cavity, electrical leads from said receptacle traversing said closure to enter said cavity, means conductively bonding said leads to said crystal, an inert fluid in said cavity surrounding said bonding means, and a potting compound in said receptacle and separated from said fluid by said sealing closure.

8. An optical system comprising a body formed with a pocket and a receptacle surrounding said pocket, a lens integral with said body to direct light rays to a selected location in said pocket, a rib on said lens located in said pocket, a photoelectric crystal at said location in said pocket in contact with said rib, an inert fluid filling said pocket to form a continuous optical medium free from reflections between said crystal and said rib, electrical leads in said receptacle extending into said fluid and connected to said crystal, electrical components in said receptacle for operative association with said crystal, a potting compound in said receptacle encapsulating said components, and means sealing said pocket, whereby said fluid is maintained out of contact with said compound.

9. An optical system according to claim 8 wherein a masking means is associated with said rib for preventing undesired light rays from reaching said photoelectric crystal.

10. In an optical system operating in conjunction with photoelectric means the combination of a body having an inner pocket formed therein, photoelectric means located in such pocket, means for directing light from an external source onto said photoelectric means, an inert fluid filling said pocket, an outer receptacle formed in said body surrounding said pocket, circuit components operatively connected to said photoelectric means located in said receptacle, material filling said receptacle for encapsulating said components, and sealing means maintaining said material out of contact with said photoelectric means and said fluid.

11. In an optical system, a unitary assembly comprising a body portion providing a hollow receptacle portion and a supplemental cavity portion in the interior thereof, lens means of substantially hemispherical shape positioned adjacent to said cavity portion and arranged to direct light from an external source therewithin, a photoelectrically sensitive element in said cavity portion and fixedly supported in relation to said lens means, one or more electric circuit components in circuit relationship to said element fixedly mounted within said receptacle portion through the agency of material substantially filling the remainder of the receptacle portion, and means sealing said cavity portion from said receptacle portion thereby to exclude said potting material from said cavity portion.

12. An optical system as defined in claim 11 wherein said means sealing said receptacle and said cavity portions one from another is liquid-tight, and wherein said cavity portion is filled with a liquid having no deleterious effect on said photoelectrically sensitive element therewithin.

13. In an optical system a unitary structure comprising a housing shaped to form a recess therein and having an integrally-formed lens portion arranged to receive light from an external source and convergingly direct the received light into the recess, liquid-tight sealing means dividing said recess into two parts respectively adjacent and non-adjacent to said lens means, a photoelectrically sensitive element mounted in said recess part adjacent to said lens portion and positioned therein to receive light directed into the recess by the lens means, and one or more circuit components electrically connected with said element mounted in said recess part non-adjacent to said lens portion, and material potting said one or more circuit components in said last named recess part.

14. In an optical system as defined in claim 13 wherein the part of said recess adjacent to said lens portion is filled with an inert liquid.

15. In a photoelectric control system, the combination of a housing having a central cavity therein, a substantially hemispherical lens closing one end of said cavity and operable to converge light rays within the cavity, said lens having an internal integrally formed light transmitting projection in said cavity, a photoelectrically sensitive member, means closing the opposite end of said cavity, said means fixedly positioning said member with a sensitive surface area thereof in substantially surface contact with said projection of the lens, and an inert liquid within the closed cavity, said liquid having a light refractive index similar to that of said lens and the light transmitting projection thereof.

16. A light sensitive electrical device comprising a solidified plastic body substantially hemispherically shaped to form a lens, the light emergent face of the lens being rendered opaque except for a narrow light transmitting slot, an electrical component sensitive to light and constituted by a strip of material having a longitudinal dimension greater than the width of said light transmitting slot and further having electrical leads connected to the opposite ends thereof, and means supporting the light sensitive strip adjacent to the emergent face of the lens with the strip extending crosswise to the light transmitting slot thereof so that only an intermediate portion of the strip receives light emerging from the lens.

17. In an optical system, a unitary assembly comprising, a body member providing a hollow receptacle portion and a supplemental cavity portion in the interior thereof, lens means arranged across and sealing one end of said cavity portion and arranged to direct light from an external source therewithin, means sealing the other end of said cavity, a light sensitive element within said cavity and positioned to receive light directed therein by said lens means, electrically conductive leads extending through said sealing means with ends of said leads supporting said light sensitive element within said cavity, the other ends of said leads extending into said receptacle portion, one or more electrical components within said last mentioned portion and electrically connected to the other ends of said leads, and means retaining said components within said receptacle portion with leads therefrom extending to the exterior of said receptacle.

18. In a light sensitive electrical device, a body shaped to form a lens, a light sensitive electrical component constituted by a narrow strip of material positioned beneath the light emergent face of the lens, means interposed between said light emergent face of said lens and said electrical component forming a narrow light transmitting slot to limit the light emerging from said light emergent face to a narrow area defined by said slot, said electrical component having a longitudinal dimension greater than the width of said light transmitting slot and further having electrical leads connected to the opposite ends thereof, and means supporting said light sensitive strip adjacent to the emergent face of the lens with the strip extending crosswise to the light transmitting slot so that only an intermediate portion of the strip receives light emerging from the lens.

References Cited in the file of this patent

UNITED STATES PATENTS

| | | |
|---|---|---|
| 1,697,451 | Baird | Jan. 1, 1929 |
| 1,907,124 | Ruben | May 2, 1933 |
| 2,239,263 | Waine et al. | Apr. 22, 1941 |
| 2,640,901 | Kinman | June 2, 1953 |
| 2,644,852 | Dunlap | July 7, 1953 |
| 2,668,867 | Exstein | Feb. 9, 1954 |
| 2,671,154 | Burstein | Mar. 2, 1954 |
| 2,839,645 | Hester | June 17, 1958 |